United States Patent
Berger

[11] Patent Number: 5,730,117
[45] Date of Patent: Mar. 24, 1998

[54] SUN TRACKER

[76] Inventor: Alexander Berger, Konigsbergerstrasse 196, D-76739 Karlsruhe, Germany

[21] Appl. No.: 564,139

[22] PCT Filed: Jun. 1, 1994

[86] PCT No.: PCT/DE94/00612
§ 371 Date: Nov. 29, 1995
§ 102(e) Date: Nov. 29, 1995

[87] PCT Pub. No.: WO94/28360
PCT Pub. Date: Dec. 8, 1994

[30] Foreign Application Priority Data

Jun. 1, 1993 [DE] Germany .......... 43 18 103.1
Dec. 7, 1993 [DE] Germany .......... 43 41 630.6
Mar. 2, 1994 [DE] Germany .......... 44 06 765.8

[51] Int. Cl.$^6$ .................................................. F24J 2/38
[52] U.S. Cl. .................................. 126/604; 126/600
[58] Field of Search .......................... 126/573–582, 126/600–608, 702; 353/3

[56] References Cited

U.S. PATENT DOCUMENTS

| 4,328,789 | 5/1982 | Nelson | 126/579 |
| 4,424,802 | 1/1984 | Winders | 126/578 |
| 4,968,355 | 11/1990 | Johnson | 126/573 |

FOREIGN PATENT DOCUMENTS

| 0164066 | 12/1985 | European Pat. Off. . |
| 2715334 | 10/1978 | Germany . |
| WO93/11392 | 6/1993 | WIPO . |

*Primary Examiner*—James C. Yeung
*Attorney, Agent, or Firm*—Baker & Daniels

[57] ABSTRACT

Prior art sun-following devices exist which have an energy-storing counterweight. While this counterweight makes operation of the drive very economical, it is expensive to manufacture. The invention calls for two sun-following devices to be linked to each other in such a way that one is used as an energy-storing counterweight for the other. This gives a system with an extremely low energy consumption which leads to significant savings with large-scale systems.

21 Claims, 3 Drawing Sheets

SUN TRACKER

BACKGROUND OF THE INVENTION

1. Field of the Invention

The invention refers to a sun tracker, or an appliance, moving solar technical application units (solar assemblies) dependent on the position of the sun.

2. Description of the Related Art

Systems with several sun trackers (trackers) with hydraulic actuators driven by a common pressure source are known. Each tracker must be controlled individually in these systems, only to be realized by an extensive control. Additionally, the energy consumption of such system is very high (see DE 2715334). Hydraulic trackers with counterweight are also known, with the counterweight accumulating energy while the solar assembly is sinking, to be used for lifting. Although this counterweight does permit energy-saving drive, it does however lead to additional products costs (see DE 4240541). The invention's task is to eliminate the above problems.

SUMMARY OF THE INVENTION

This task, to provide simple control for systems of several trackers, is basically solved by coupling actuators of two trackers directly with each other by a hydraulic direct power transmission. It is thus sufficient to move only one solar assembly in accordance with the position of the sun, to have the other solar assembly also move accordingly, and thus without additional control. The two trackers are able to be a partition of a system of several trackers. If the solar assembly and/or parts with variable height of one of said trackers are used as energy-accumulating counterweight for the other one, this leads to a system of two trackers with extremely low energy consumption, resulting in considerable system advantages especially for heavy solar assemblies.

Also, each tracker may contain an actuator element such as a piston, with the pistons being part of a cylinder and performing either inverse linear movement or linear movement in the same. The piston may be connected with or be part of a pole which slides in a guide tube of the solar assembly. Inverse helical guide ways may be used for rotating the solar assemblies in the same direction, or alternatively helical guide ways turning in the same direction may be used for rotating the solar assemblies in the same direction.

The solar assembly may be rotated by the effect of bars (21, 21') of both trackers which are respectively coupled in such way that the direction of rotation of the solar assemblies is the same. One tracker may comprise a counterweight, accumulating energy for reuse during lifting while the solar assembly and/or parts of the tracker with variable height are sinking. The counterweight may be realized through the solar assembly and/or parts with variable height of another tracker.

Double-acting cylinders may act as actuators, wherein all cylinders are connected in series. With the series connection of cylinders, a uniform direction of rotation of all solar assemblies is achieved with a top chamber of one unit being respectively connected with a top chamber of a different unit through a hydraulic line, and all cylinders thus being connected in a closed hydraulic circulation.

The invention may also be used for a biaxial tracker, with an interior pole, capable of carrying the solar assembly through a turning knuckle, being guided in an exterior pole. A bar may be pivotally connected with the exterior pole and the solar assembly, with a free space existing between guide tubes and the pistons. The minimal length of the free space corresponds to the stroke length of the exterior pole. The free spaces are sealed at top and bottom seals and are hydraulically connected with each other on the one side and on the other side with a respective cylinder allocated to the interior pole. The said free spaces serve as the helical guide ways.

Actuators for any of the above may be limited rotary hydraulic motors. Also, the trackers may be coupled with each other in the manner of a mechanical balance through a mechanical power transmission.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1A:
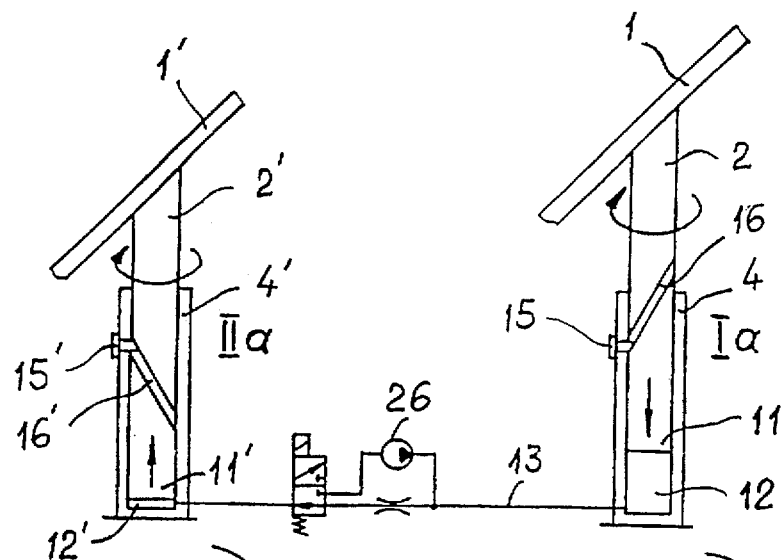
FIGS. 1a and 1b show units of two single-axis sun trackers.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

Figure 1B:
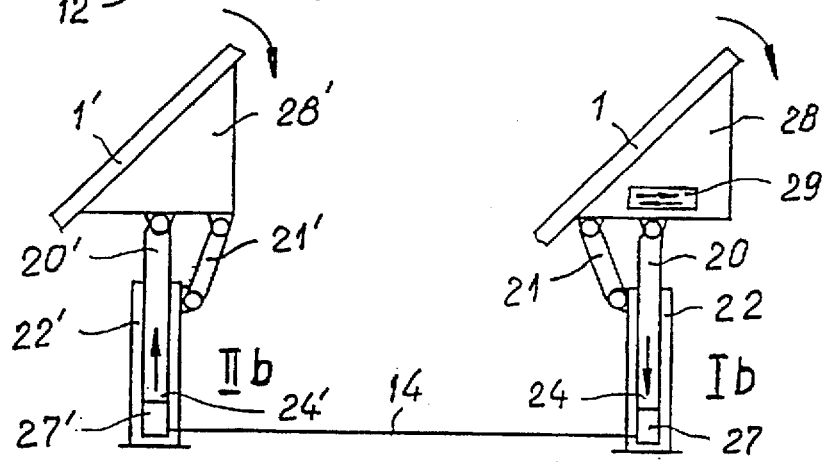

FIGS. 1a and 1b each show a tracker (1a, 1b), with a pole (2, 20) sliding in a guide tube (4, 22), carrying a solar assembly (1) at its top. Each tracker is supported below by a single-acting cylinder (12, 27) and coupled with a counterweight acting as energy accumulator. The energy accumulator acts in the manner of a hydraulic balance through a hydraulic power transmission. The transmission consists of a single-acting cylinder (12, 27), a hydraulic line (13, 14), and a second single-acting cylinder (12, 27'). Alternatively, mechanical instead of hydraulic power transmission may also be used.

Serving as counterweight are the solar assembly and parts with variable height of a second sun tracker of the same construction type (IIa, IIb). The trackers are coupled with each other in such way that the pole of one tracker is lifted simultaneously while the other tracker's pole is sinking, with the direction of rotation of said solar assemblies being the same. Rotation in the same direction for trackers with vertical rotational axis is achieved in accordance with FIG. 1a by inverse helical guide ways (16 and 16') (in the figure shown as helical grooves (16, 16') with bolts (15, 15')), transforming a linear movement of the poles into a respective rotation.

For trackers with preferably horizontal axis of rotation in accordance with FIG. 1b, a rotation in the same direction is achieved by bars (21, 21'). The bars are located on the one side coupled to supporting constructions (28, 28') of the solar assemblies each through a turning knuckle. The bars' turning knuckle is located on a different side than the coupling points connecting the poles (20, 20') with the respective constructions (28, 28'). On the other side, the bars (21, 21') are pivotally connected with the guide tube (22, 22') or a different fixed point. In an alternative embodiment, the bars (21, 21') may be connected stationary and the guide tubes (22, 22') pivotally to the ground. Another alternative embodiment includes an additional pivoting bar which may be respectively installed between the pole (20, 20') and the construction (28, 283, with the guide tubes (22, 22') and the bars (21, 21') being stationary.

The rotation of both solar assemblies in one direction (e.g., during day time) is achieved by the solar assembly and parts with variable height of one tracker (Ia) (FIG. 1a) being slightly heavier than those of the other (IIa). In the opposite direction, the rotation of both solar assemblies (e.g., during night time) is achieved by a pump (26) or the like. Control in accordance with FIG. 1b is performed by shifting a single weight (29) connected with the tracker's (Ib) construction (28) and being equipped with an electric drive, with the other tracker (IIb) thus inevitably rotating accordingly.

Figure 2:
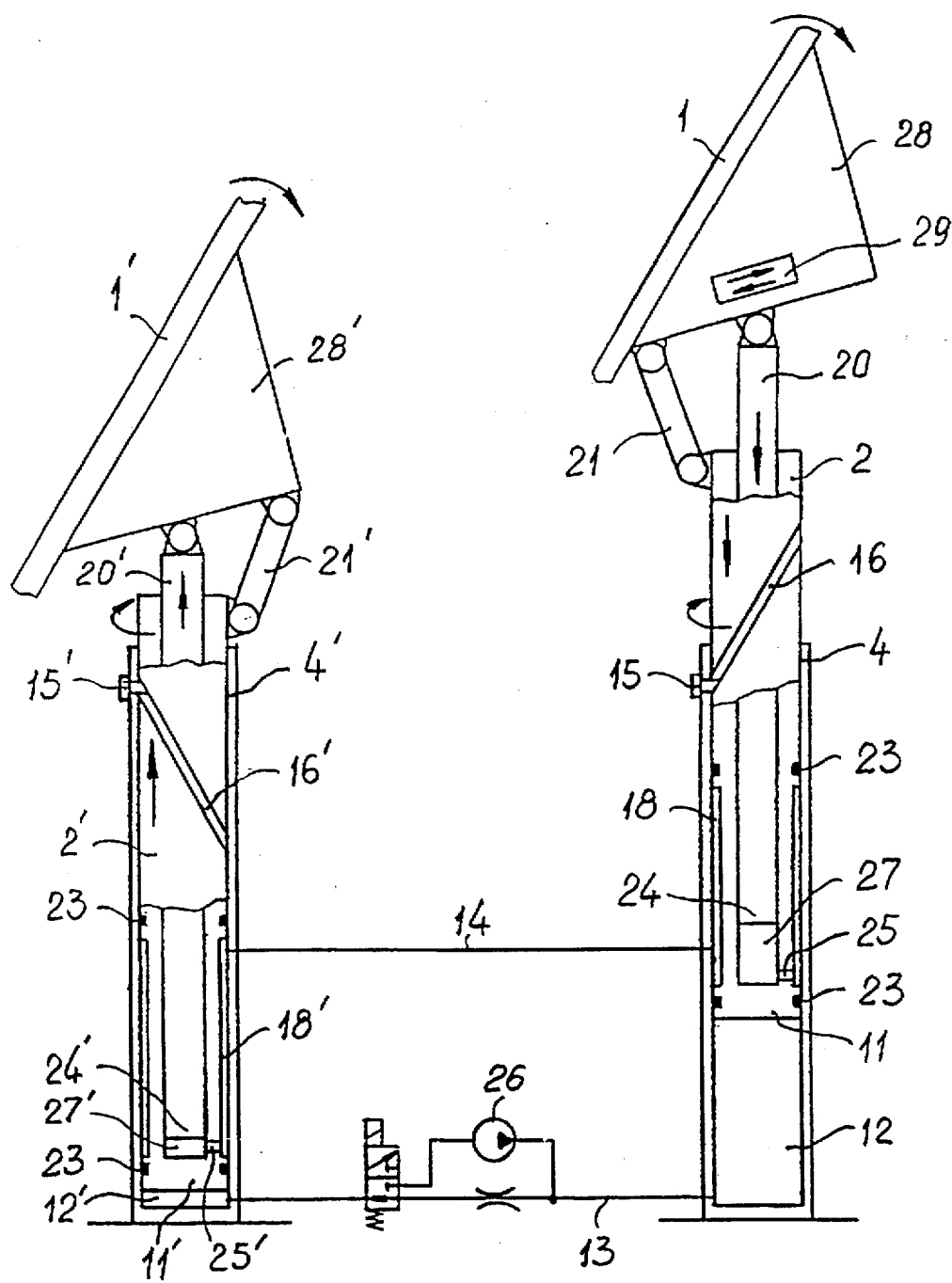
FIG. 2 shows a unit of two biaxial sun trackers.

FIG. 2 displays two biaxial trackers coupled with each other, which are a combination of said single-axis trackers described in FIGS. 1a and 1b. An interior pole (20) is movably positioned in an exterior pole (2), which in turn moves in the guide tube (4). A ring-shaped space (18, 18') is comprised on the perimeter of each piston (11, 11') allocated to the exterior pole. The ring-shaped spaces are connected with each other by the hydraulic line (14) and with a respective cylinder (27, 27') allocated to the interior pole (20, 20') by the hydraulic line (25, 25'). Piston seals (23) are installed above and below the ring-shaped space (18, 18'), the minimal length of which corresponds to the pole's stroke length (2). The hydraulic power transmission (12, 13, 12') between the poles (2, 2') and the hydraulic power transmission (27, 25, 18, 14, 18', 25', 27') between the poles (20, 20') are thus uncoupled from each other in every position of the poles. The bars (21, 21') are pivotally coupled with the constructions (28, 28') and the exterior poles (2, 2') in accordance with a same direction of rotation of the solar assemblies.

Figure 3A:
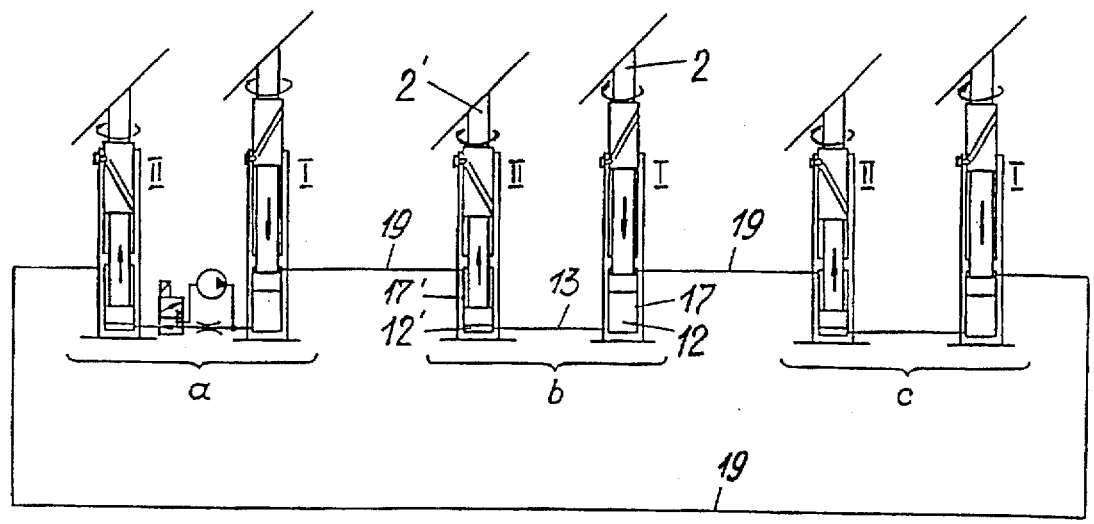
FIGS. 3a and 3b show a system consisting of several units.
Figure 3B:
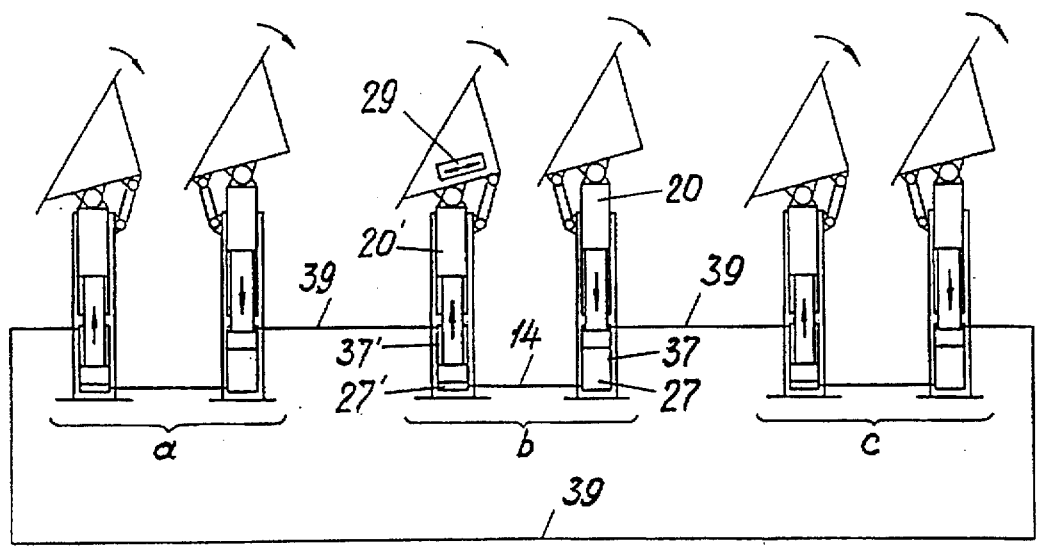

FIGS. 3a and 3b each show a system consisting of three units (a, b, c), with each unit comprising two trackers in accordance with FIG. 1a or FIG. 1b. The poles (2, 2', 20, 20') are in this case supported by double-acting cylinders (17, 17', 37, 37'). The units (a, b, c) are coupled with each other through the top chambers of the double-acting cylinders, with the top chamber of the tracker (I) of one unit being respectively connected with only the top chamber of the tracker (II) of a different unit through a hydraulic line (19, 39). Only one tracker must therefore be controlled, e.g., as described for FIG. 1; all others inevitably move correctly. The total weight of the movable parts of all trackers (I) in FIG. 3a is normally higher than that of all trackers (II).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

I claim:

1. Unit comprised of two solar tracking devices which move corresponding solar assemblies in relation on the position of the sun, and power transmission means for operably coupling the two solar tracking devices in such a way such that when one of the corresponding solar assemblies is moved in a direction corresponding with the position of the sun, the other of the corresponding solar assemblies moves in a direction corresponding with the position of the sun.

2. The unit of claim 1 wherein the two tracking devices each have an actuator which move relative to each other in an approximately opposite linear motion.

3. The unit of claim 2 further comprising oppositely spiraled guides formed in each of the tracking devices, wherein the power transmission means acts on the spiraled guides and causes equidirectional rotation of the solar assemblies.

4. The unit of claim 16 wherein one of the tracking devices includes a counterweight comprised of one of a solar assembly and a portion of a variable height tracker, the counterweight being structured and arranged so that when the counterweight descends, the counterweight stores energy for reuse in ascending.

5. The unit of claim 2 wherein each of the two tracking devices further comprise at least one bar, and the bars of the two tracking devices are attached in such a way so that the rotation of the solar assemblies are equidirectional.

6. The unit of claim 2 wherein one of the tracking devices includes a counterweight comprised of one of a solar assembly and a portion of a variable height tracker, the counterweight being structured and arranged so that when the counterweight descends, the counterweight stores energy for reuse in ascending.

7. The unit of claim 1 wherein the two tracking devices each have an acutator which move relative to each other in an approximately equidirectional linear motion.

8. The unit of claim 7 father comprising equidirectional spiraled guides formed in each of the tracking devices, wherein the power transmission means acts on the spiraled guides and causes equidirectional rotation of the solar assemblies.

9. The unit of claim 7 wherein each of the two tracking devices further comprise at least one bar, and the bars of the two tracking devices are attached in such a way so that the rotation of the solar assemblies are equidirectional.

10. The unit of claim 1 wherein each of the two tracking devices further comprise at least one bar, and the bars of the two tracking devices are attached in such a way so that the rotation of the solar assemblies are equidirectional.

11. The unit of claim 10 wherein one of the tracking devices includes a counterweight comprised of one of a solar assembly and a portion of a variable height tracker, the counterweight being structured and arranged so that when the counterweight descends, the counterweight stores energy for reuse in ascending.

12. The unit of claim 1 wherein one of the tracking devices includes a counterweight comprised of one of a solar assembly and a portion of a variable height tracker, the counterweight being structured and arranged so that when the counterweight descends, the counterweight stores energy for reuse in ascending.

13. The unit of claim 12 wherein the tracking devices are coupled to one another by a mechanical force transmission device arranged as a mechanical balance.

14. The unit of claim 1 further comprising a swivel motor coupled to one of the solar assemblies, the swivel motor capable of moving the solar assemblies.

15. The unit of claim 1 further comprising a cylinder coupled to one of the solar assemblies, the cylinder capable of moving the solar assemblies.

16. The unit of claim 1 wherein one of the two tracker devices comprises a two axis tracker device, the two axis tracker device including a first axis having a housing and a first actuator, a second axis having a second actuator, and an outer hydraulic line; the first axis including a void formed between the housing and the first actuator and bound by two sealings; the minimum length of the void matching the stroke of the first actuator; and the void being connected hydraulically with the second actuator and with the outer hydraulic line.

17. The unit of claim 16 wherein the void is defined by spiraled guides.

18. A system comprising a plurality of tracking devices, at least one of the plurality of tracking devices including a unit comprised of first and second solar tracking devices which move corresponding solar assemblies in relation on the position of the sun, and the unit also including power transmission means for operably coupling the first and second solar tracking devices in such a way such that when one of the corresponding solar assemblies is moved in a direction corresponding with the position of the sun, the other of the corresponding assemblies moves in the direction corresponding with the position of the sun.

19. The system of claim 18 wherein the plurality of tracking devices are connected in series such that rotation of the solar assemblies are equidirectional.

20. The system of claim 18 wherein one of the tracking devices comprises a two axis tracker device, the two axis tracker device including a first axis having a housing and a first actuator, a second axis having a second actuator, and an outer hydraulic line; the first axis including a void formed between the housing and the first actuator and bound by two sealings; the minimum length of the void matching the stroke of the first actuator; arid the void being connected hydraulically with the second actuator and with the outer hydraulic line.

21. The system of claim 20 wherein the void is defined by spiraled guides.

* * * * *

UNITED STATES PATENT AND TRADEMARK OFFICE
CERTIFICATE OF CORRECTION

PATENT NO. : 5,730,117
DATED : March 24, 1998
INVENTOR(S) : Alexander Berger

It is certified that error appears in the above-indentified patent and that said Letters Patent is hereby corrected as shown below:

Claim 20, col. 6, line 15 delete "arid" and insert --and--.

Signed and Sealed this

Twenty-eighth Day of July, 1998

Attest:

BRUCE LEHMAN

*Attesting Officer*  *Commissioner of Patents and Trademarks*